United States Patent [19]

Poetsch

[11] 4,127,865

[45] Nov. 28, 1978

[54] SYSTEM AND METHOD FOR DECODING TIME-DIVISION-MULTIPLEXED COLOR T.V. SIGNALS

[75] Inventor: Dieter Poetsch, Ober Ramstadt, Fed. Rep. of Germany

[73] Assignee: Robert Bosch GmbH, Stuttgart, Fed. Rep. of Germany

[21] Appl. No.: 810,960

[22] Filed: Jun. 29, 1977

[30] Foreign Application Priority Data

Jul. 2, 1976 [DE] Fed. Rep. of Germany ....... 2629707

[51] Int. Cl.² .............................................. H04N 9/32
[52] U.S. Cl. ..................................................... 358/12
[58] Field of Search ................................... 358/12, 17; 179/15.55 T

[56] References Cited

U.S. PATENT DOCUMENTS 3,548,091  12/1970  Bockwoldt ............................ 358/17
3,781,463  12/1973  Van den Bussche .................. 358/12

FOREIGN PATENT DOCUMENTS 2,348,291  4/1975  Fed. Rep. of Germany ............. 358/12

Primary Examiner—Richard Murray
Assistant Examiner—Aristotelis M. Psitos
Attorney, Agent, or Firm—Michael J. Striker

[57] ABSTRACT

A color T.V. signal includes first and second color-information signals time-division-multiplexed in alternate horizontal line intervals. The first and second signals are written-in in alternation into a first storage device. Only one of the two signals is written-in into a second storage device. Only the other of the two signals is written-in into a third storage device. The storage devices are then read-out in such a manner as to recreate the simultaneous relationship of the first and second color-information signals. As a result of this procedure, each color-information signal passes through only one storage device.

7 Claims, 2 Drawing Figures

SYSTEM AND METHOD FOR DECODING TIME-DIVISION-MULTIPLEXED COLOR T.V. SIGNALS

BACKGROUND OF THE INVENTION

British Pat. No. 1,373,943 discloses a system in which the color-difference signals of a color T.V. signal are time-compressed and transmitted in time-division-multiplexed manner in alternate horizontal line intervals during time intervals corresponding approximately to the back porches of the color T.V. signal. To decode the thusly transmitted signals, the time-compressed color-difference signals are first applied to a storage which effects decompression (time-expansion), and then the decompressed color-difference signals are applied to another storage, so that the non-simultaneously transmitted (time-division-multiplexed) color-difference signals can be converted into simultaneous color-difference signals, for subsequent application to a conventional dematrix. The storages which can be used are per se conventional and include, for example, bucket-brigade storages, charge-coupled storages or series-anolog storages; time-compression and time-expansion of signals is per se conventional.

The disadvantage of the known decoding system is that the system inherently produces a marked deterioration in the signal-to-noise ratios of the signals. This is particularly the case when, in accordance with the known decoding system, a color-difference signal must be transmitted through a plurality of successive storages.

SUMMARY OF THE INVENTION

It is a general object of the invention to provide a novel decoding system and method which avoids the disadvantages of the known method.

It is another object to provide a novel system and method such that each signal to be decoded need pass through only a single storage, not a plurality of successive storages.

It is a related object to provide a novel system and method in which the number of storages needed for decoding is as small as possible.

These objects can be achieved, according to one concept of the invention, by utilizing three storages. Preferably, each storage is capable of effecting the requisite time-expansion of a time-compressed signal. Two time-compressed and time-division-multiplexed color information signals are preferably transmitted during alternate horizontal blanking intervals. In any event, the two signals are alternately applied to the first of the three storages — i.e., the first storage alternately receives the first and then the second signal — whereas the two signals are also applied, but only individually, to respective ones of the second and third storages — i.e., the second storage receives only one signal, and the third storage receives only the other signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
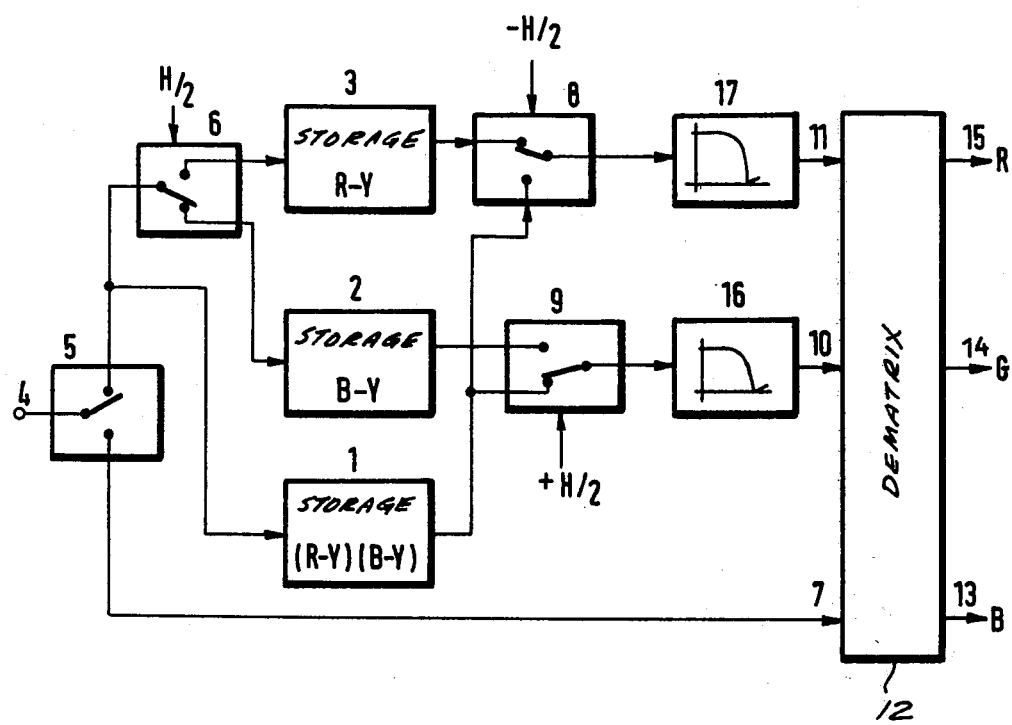
FIG. 1 is a schematic block circuit diagram of an exemplary decoder according to the invention.

FIG. 1 is a schematic block diagram of a decoder embodying the inventive concepts. Conventional components not pertaining to the inventive concepts, e.g., input and output amplifiers, synchronizing circuits, clamping circuits, and the like, have been omitted for the sake of clarity.

The signals to be decoded are applied to the input 4 of the decoder. Input 4 is connected, via electronic changeover switches 5 and 6, to the luminance-signal input 7 of a conventional dematrix 12 and also to the inputs of three storages 1, 2 and 3. The output signals from storages 1, 2, 3 are transmitted, via electronic changeover switches 8 and 9, to the color-difference signal inputs 10 and 11 of the dematrix 12. The dematrix 12 furnishes at its outputs 13, 14, 15 the color signals R, B and G.

Figure 2:
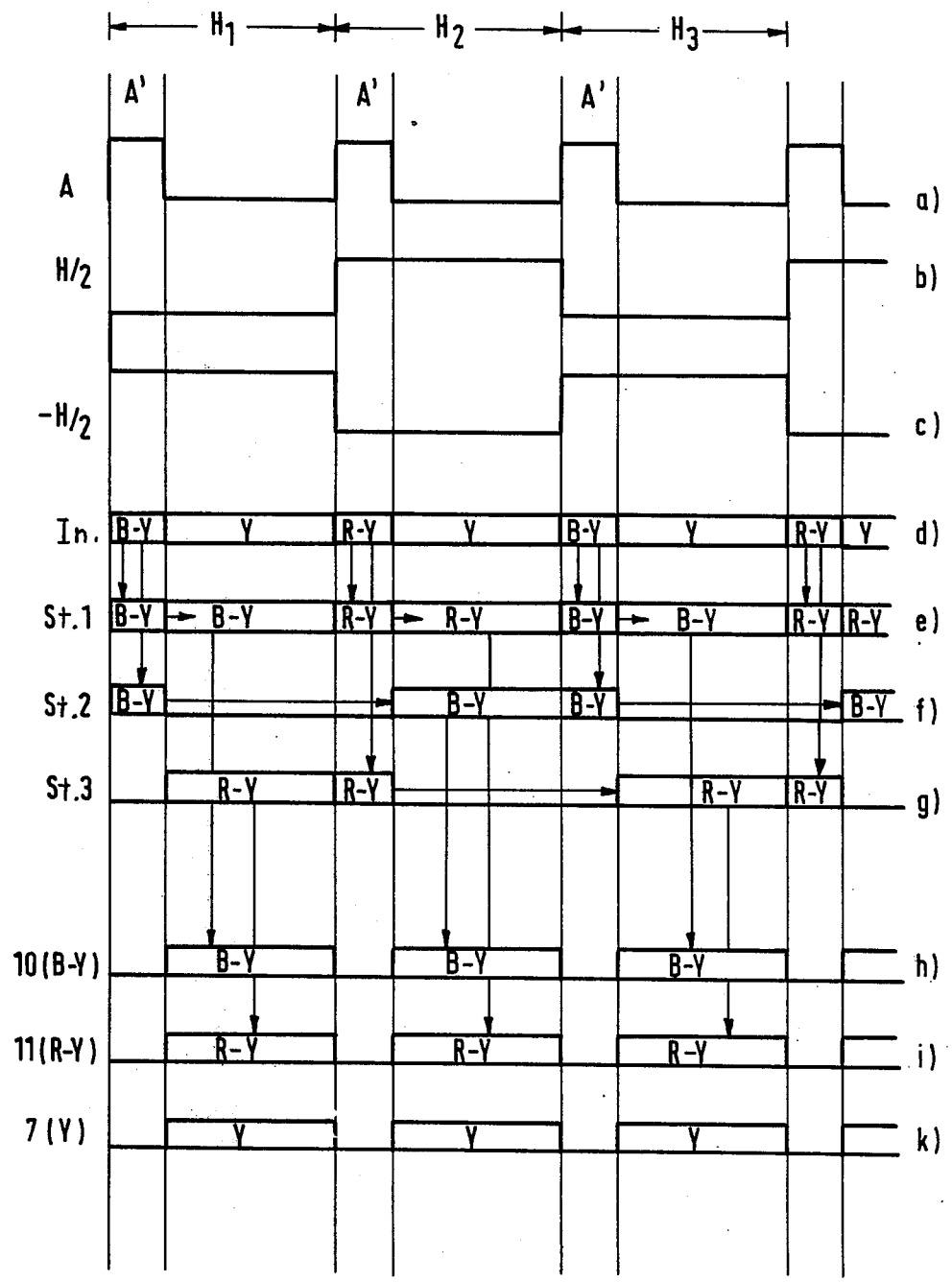
FIG. 2 depicts the relationships in time as between the various signals of the decoder of FIG. 1, and is referred to in the explanation of the operation of FIG. 1.

The operation of the decoder of FIG. 1 is explained with reference to the pulse diagrams in FIG. 2. In FIG. 2, the time intervals denoted by $H_1$, $H_2$, $H_3$, etc., are line periods, whereas the A' time intervals are horizontal blanking intervals.

The time-compressed and time-division-multiplexed input signals B-Y, R-Y and Y are shown in line d of FIG. 2. The color-difference signals B-Y and R-Y are both time-compressed and transmitted during alternate horizontal blanking intervals A'. The luminance signal Y is not time-compressed and is transmitted during the so-called active line periods (the portion of the line interval exclusive of the horizontal blanking interval).

The pulse trains shown in lines a, b and c of FIG. 2 represent the control pulses applied to various ones of the electronic changeover switches. For each changeover switch, the switch is in its upper setting (as seen in FIG. 1), when the corresponding pulse train in FIG. 2 has a high value.

Changeover switch 5 is controlled by the pulse train shown in line a. Accordingly, during the active line periods (the intervals between successive blanking intervals), switch 5 is in its lower setting, so that the luminance signal Y, which is received during the active line period and which is not time-compressed, can be transmitted directly to luminance-signal input 7 of dematrix 12.

During the blanking intervals A', switch 5 is in its upper setting. As a result, the color-difference signals B-Y and R-Y are each transmitted to the first storage 1, and also to the changeover switch 6. Thus, during each blanking interval A', whichever of the two color-difference signals is currently being received, is written-in into the first storage 1. This is indicated in FIG. 2 by the short arrows extending from line d down to line e.

Changeover switch 6 is controlled by the pulse train shown in line b. This pulse train has a frequency equal to one half the line frequency. Accordingly, during the first illustrated blanking interval A', the color-difference signal B-Y is written-in into storage 2 (indicated by the long arrow extending down from line d to f); then, during the second illustrated blanking interval A', the color-difference signal R-Y is written-in into the storage 3 (indicated by the long arrow extending down from line *e* to *g*); then, during the third illustrated blanking interval A', the color-difference signal B-Y is again written-in storage 2; and so forth.

Thus, second storage 2 receives only the color-difference signal B-Y, whereas third storage 3 receives only the color-difference signal R-Y. In contrast, first storage 1 receives (alternately) both color-difference signals.

The actual writing-in of the color-difference signals into the storages 1, 2, 3 is effected by means of a series of write-in pulses. The decompression of the two signals B-Y and R-Y is effected during the read-out from storages 1, 2, 3, by using read-out pulses whose repetition frequency is lower than that of the write-in pulses by a factor equal to the requisite time-decompression factor. This is per se conventional in the signal-transmission art, and need not be explained in greater detail here.

Changeover switches 8 and 9 are respectively controlled by the H/2 and −H/2 pulse trains (lines *b* and *c* of FIG. 2). Switches 8, 9 transmit signals from the storages 1, 2, 3 to the dematrix inputs 10, 11 in a predetermined sequence. Whichever one of the two color-difference signals is present at the output of the first storage 1 is transmitted to the appropriate one of the two dematrix inputs 10, 11. During the time intervals in which one color-difference signal is being read-out at the output of storage 1, the other color-difference signal is being read-out at the output of storage 2 or 3 and transmitted to the appropriate dematrix inputs.

Specifically:

During the interval $H_1$, the signal B-Y is decompressed and read-out at the output of storage 1 and transmitted to input 10 of dematrix 12; this is shown in FIG. 2 by the lone arrow extending down from line *e* to line *h*, within the time interval $H_1$. During the same time interval $H_1$, the signal R-Y is decompressed and read-out at the output of storage 3 and transmitted in input 11 of dematrix 12; this is shown in FIG. 2 by the long arrow extending down from line *g* to line *i*.

During the next line interval $H_2$, the R-Y signal is decompressed and read-out at the output of storage 1 and transmitted to input 11 of dematrix 12; this is shown in FIG. 2 by the long arrow extending down from line *e* to line *i*. During the same time interval $H_2$, the B-Y signal is decompressed and read-out at the output of storage 2 and transmitted to input 10 of dematrix 12; this is shown in FIG. 2 by the long arrow extending down from line *f* to line *h*.

In contrast, the luminance signal Y, because it is not time-compressed, and because it is transmitted during each and every line interval $H_1$, $H_2$, $H_3$, etc., is transmitted, during each and every line interval H, through the changeover switch 5 and from there directly to the luminance-signal input 7 of dematrix 12.

Accordingly, during for example line interval $H_2$, it can be readily seen from lines *h*, *i* and *k* of FIG. 2, that all three inputs 7, 10, 11 of dematrix 12 are in simultaneous receipt of the necessary, corresponding and uncompressed signals (i.e., the two color-difference signals and the luminance signal).

The writing-in and reading-out of the color-difference signals into and out from the three storages, by means of trains of write-in pulses and trains of read-out pulses, can introduce higher-frequency noise into the decompressed color-difference signals. Accordingly, low-pass filters 16, 17 of suitable cut-off frequency are connected between the outputs of changeover switches 8, 9 and the color-difference inputs 10, 11 of dematrix 12.

In the exemplary embodiment, the color information signals are time-division-multiplexed and also time-compressed when they are received by the decoder. However, the decoder could also be used to decode time-division-multiplexed color information signals which are not time-compressed. In that case, it would be necessary to make the pulse repetition frequency of the write-in and read-out pulses applied to each color information storage identical.

In the exemplary embodiment, the three multiplexed signals consist of two color-difference signals and one luminance signal. However, it would also be possible to decode three correspondingly multiplexed signals consisting of three simple color signals, e.g., R, B and G. In that event, whichever one of the three color signals R, B and G occupies the time intervals occupied by the luminance signal Y in line *d* of FIG. 2, would likewise be diverted past all the storages and directly transmitted to the output; the dematrix 12 would of course be unnecessary, if three simple color signals R, B and G were involved.

It will be understood that each of the elements described above, or two or more together, may also find a useful application in other types of circuits and circuit operations differing from the types described above.

While the invention has been illustrated and described as embodied in the decoding of time-compressed and time-division multiplexed color-difference and luminance signals, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a system for decoding a transmitted color T.V. signal of the type comprising first and second color-information signals time-division-multiplexed in alternate horizontal line intervals, in combination, first, second and third storage means; and routing means operative for writing-in into the first storage means the multiplexed first and second signals in alternation, operative for writing-in into the second storage means only one of the two multiplexed signals, and operative for writing-in into the third storage means only the other of the two multiplexed signals.

2. In a system as defined in claim 1, the first and second color-information signals being time-compressed signals, the first, second and third storage means each being a time-decompression storage means.

3. In a system as defined in claim 2, the system including a dematrix having at least first and second inputs for receipt of color-information signals, the routing means comprising means operative during first horizontal line intervals for simultaneously routing the first time-compressed color-information signal to both the first and second storage means, and operative during second horizontal line intervals for simultaneously routing the second time-compressed color-information signal to both the first and third storage means, and means operative during first horizontal line intervals for transmitting decompressed color-information signals from the output of the first storage means to the first dematrix input and from the output of the third storage means to the second dematrix input, and operative during second horizontal line intervals for transmitting decompressed color-information signals from the output of the first storage means to the second dematrix input and from the output of the second storage means to the first dematrix input.

4. In a system as defined in claim 1, the routing means connecting the inputs and outputs of the first, second and third storage means in parallel, and including means for coordinating the operations of the storage means by applying write-in and read-out signals thereto.

5. In a method of decoding a transmitted color T.V. signal of the type comprising first and second colorinformation signals time-division-multiplexed in alternate horizontal line intervals, the steps of alternately writing-in the first and second signals into a first storage means; writing-in into a second storage means only one of the two signals; and writing-in into a third storage means only the other of the two signals.

6. In a method as defined in claim 5, the first and second color-information signals being time-compressed signals, further including the step of reading-out the signals stored in the first, second and third storage means and effecting time-expansion of the time-compressed signals during read-out.

7. In a method as defined in claim 6, during first horizontal line intervals simultaneously routing the first time-compressed color-information signal to both the first and second storage means, during second horizontal line intervals simultaneously routing the second time-compressed color-information signal to both the first and third storage means, during first horizontal line intervals transmitting decompressed color-information signals from the output of the first storage means to the first input of a dematrix and from the output of the third storage means to a second input of the dematrix, during second horizontal line intervals transmitting decompressed color-information signals from the output of the first storage means to the second dematrix input and from the output of the second storage means to the first dematrix input.

* * * * *